(12) United States Patent
Kwon

(10) Patent No.: US 7,814,725 B2
(45) Date of Patent: Oct. 19, 2010

(54) METHOD FOR REPLACING CONCRETE UTILITY POLE WITHOUT INTERRUPTING POWER SUPPLY BY ADOPTING POLE CLAMP AND POLE CRUSHER

(75) Inventor: Sae Won Kwon, Goesan-Gun (KR)

(73) Assignee: Daewoo Electric Co. Ltd., Jinchun-Gun, Choongchungbuk-Do (KR)

( * ) Notice: Subject to any disclaimer, the term of this patent is extended or adjusted under 35 U.S.C. 154(b) by 340 days.

(21) Appl. No.: 12/213,028

(22) Filed: Jun. 13, 2008

(65) Prior Publication Data

US 2009/0169309 A1 Jul. 2, 2009

(30) Foreign Application Priority Data

Dec. 28, 2007 (KR) .................. 10-2007-0139938

(51) Int. Cl.
*E04G 21/00* (2006.01)
(52) U.S. Cl. .................. 52/745.17; 52/514; 52/40; 29/897.34; 29/402.01; 29/402.08
(58) Field of Classification Search .......... 52/745.1, 52/745.17, 745.18, 848, 514, 514.5, 40; 29/897.34, 29/402.01, 402.03, 402.08, 426.4; 125/23.01
See application file for complete search history.

(56) References Cited

U.S. PATENT DOCUMENTS

| | | | | |
|---|---|---|---|---|
| 3,911,548 A | * | 10/1975 | Perry ...................... | 29/402.12 |
| 4,033,080 A | * | 7/1977 | Fukushima ................ | 52/223.4 |
| 4,044,749 A | * | 8/1977 | Bowen et al. ............ | 125/23.01 |
| 4,048,779 A | * | 9/1977 | Valenziano et al. ........... | 52/849 |
| 4,066,372 A | * | 1/1978 | Swanson et al. ............ | 403/302 |
| 4,092,079 A | * | 5/1978 | Swanson .................... | 403/306 |
| 4,197,828 A | * | 4/1980 | Schellhorn .............. | 125/23.01 |
| 4,371,018 A | * | 2/1983 | Arnold .......................... | 144/4 |
| 4,480,627 A | * | 11/1984 | van der Toorn .......... | 125/23.01 |
| 4,492,496 A | * | 1/1985 | Arnold ...................... | 405/303 |
| 5,025,803 A | * | 6/1991 | van der Toorn .......... | 125/23.01 |
| 5,139,006 A | * | 8/1992 | Trudeau ...................... | 125/12 |
| 5,245,982 A | * | 9/1993 | Trudeau ...................... | 125/12 |
| 5,289,816 A | * | 3/1994 | Rakowski ................ | 125/23.01 |
| 5,337,469 A | * | 8/1994 | Richey .................... | 29/402.12 |

(Continued)

FOREIGN PATENT DOCUMENTS

JP 2004204506 A * 7/2004

*Primary Examiner*—Brian E Glessner
*Assistant Examiner*—Adriana Figueroa
(74) *Attorney, Agent, or Firm*—GWiPS

(57) ABSTRACT

A method of replacing a concrete utility pole for the overhead distribution line without interrupting service is developed by adopting a pole clamp and pole crusher, whereby work stability is excellent and utility pole replacement work can be carried out quickly and effectively. The method is comprised of a process for connecting a pole clamp to the end portion of the boom of an auger crane, mounting the pole clamp onto the outer circumference of the old concrete utility pole to be replaced; mounting a pole crusher to the old utility pole below the pole clamp using a hot-line bucket truck, crushing the concrete of the old utility pole, cutting the reinforcing bars of the old utility pole, removing the lower portion of the old utility pole, erecting and installing a new utility pole, and relocating the arms and wires to the new utility pole.

3 Claims, 7 Drawing Sheets

U.S. PATENT DOCUMENTS 5,524,408 A * 6/1996 Richey ................. 52/514.5
7,421,770 B1 * 9/2008 Winter ................. 29/402.08
2006/0162275 A1 * 7/2006 Storreosater ............... 52/726.1

* cited by examiner

METHOD FOR REPLACING CONCRETE UTILITY POLE WITHOUT INTERRUPTING POWER SUPPLY BY ADOPTING POLE CLAMP AND POLE CRUSHER

BACKGROUND OF THE INVENTION

1. Field of the Invention

The present invention relates to a method for replacing a utility pole without cutting off the power supply, that is, removing an existing utility pole and erecting a new utility pole during maintenance and repair of the overhead electrical distribution line. More particularly, the utility pole replacement work is performed as follows: a pole clamp mounted on an auger crane grasps the upper portion of the old utility pole; a separate pole crusher cuts the concrete of the old utility pole; the lower portion of the old utility pole is removed and a new utility pole is installed; the arm and wire of the old utility pole are transferred to the new pole without cutting off the power supply thereby saving work, because a temporary interruption of electrical power is not required.

2. Description of the Related Prior Art

During maintenance and repair of overhead power distribution lines, it is frequently required to replace a utility pole due to a vehicle collision or general deterioration. In such a case, the work is done by erecting a new utility pole near the utility pole to be removed, and the arm and wire from the utility pole to be removed are relocated to the new utility pole using a wire relocation apparatus, without interrupting the supply of electricity.

Namely, if an accident occurred when a car, for example, collided with a concrete utility pole, the impacted portion would be damaged or the utility pole itself would be broken. And if the service life of the concrete material is exceeded, it quickly deteriorates, so it should be replaced with a new utility pole periodically.

And in the case that a new utility pole cannot be erected near the utility pole to be removed, the new utility pole should be erected in the same place as the utility pole to be removed. In such a case, because it is impossible to perform the work using the aforementioned wire relocation apparatus, the work is done using an auxiliary support device of a temporary transmission method using a bypass cable, which also allows uninterrupted flow of power during the repair.

In the case of replacing utility poles without service interruption, if a new utility pole can be erected near the utility pole to be removed, it is possible to do so using a wire relocation apparatus. But if the new utility pole should be erected in the same place where the utility pole to be removed already stands, the wire relocation apparatus cannot be applied. In such a case an auxiliary support device can be applied to replace the utility pole without interrupting service, but it is uneconomical and inefficient because the live wire is temporarily moved to an auxiliary support device made of an insulated auxiliary arm attached to an auger crane, and the wire must then be moved again to the new utility pole after the utility pole is replaced. Besides that, there is another problem in applying this method since it has a limitation of being applied only to a straight utility pole—it is impossible for utility poles of other shapes to cope with the case that the allowable tensile load of the auxiliary support device is exceeded.

Due to such a problem it is inevitable to perform the work by applying the temporary transmission method using a bypass cable. But it involves many problems such as requiring high construction cost, obstructing traffic due to equipment occupying the road, and risking the safety of pedestrians and workers.

In addition, in uninterrupted replacement work of utility poles as mentioned above, there is an inevitable case that a new utility pole has to be erected in the same place where the utility pole to be removed was erected due to the circumstances of the site where work is being done. In such a case, the auxiliary support device or the temporary transmission method using a bypass cable is traditionally applied. But the method using the auxiliary support device has a problem when the ground is not level and can be applied only to a straight utility pole, since it exceeds an allowable tensile load of the auxiliary support device, and the temporary transmission method using a bypass cable also has many problems as mentioned above. Finally, both above-mentioned methods cannot be applied to the case where commonly installed communication equipments cannot be relocated on the same day.

Namely, the uninterrupted replacement work, which is the most general form of replacing utility poles, includes a series of work processes such as the process of relocating the arm and wire from the old utility pole to the new utility pole without interrupting electrical service using a wire relocation apparatus after the new utility pole is erected on one side of the utility pole to be replaced, and the process of completing the work by removing from the ground the old utility pole after the relocation of the arm or wire is completed.

But if a building or structure is erected around the existing utility pole, or if it is difficult to excavate the ground or surface, it may be impossible to secure space for erecting a new utility pole.

Conventionally, if it is impossible to secure sufficient space for erecting a new utility pole, work is carried out by applying the method using an auxiliary support device or the method using a bypass cable although they have problems as mentioned above. Moreover, because both methods cannot be applied in a case where it is impossible to relocate commonly installed communication equipment on the same day, the deteriorated utility pole is not replaced and is left in service despite the fact that the replacement time has passed due to deterioration of the utility pole. Consequently, the utility pole is exposed to risks such as damage or destruction by natural disasters including typhoons, etc.

SUMMARY OF THE INVENTION

An objective of the present invention is to solve the above-mentioned problems by providing a method of replacing a concrete utility pole for a distribution line without interrupting service using a pole clamp and pole crusher, whereby utility pole replacement work can be carried out efficiently and safely under any conditions without the interference or influence of nearby buildings or structures or the terrain around the utility pole to be replaced. A pole clamp is mounted at one end of an auger crane boom and operated by hydraulic pressure, and a pole crusher is separately mounted to a hot-line bucket truck. The utility pole to be removed is firmly clamped by the pole clamp mounted on the auger crane, and part of the utility pole is crushed and cut by the pole crusher that has hydraulic pressure supplied from the hot-line bucket truck, so that after the existing utility pole is removed while the arm or wire is maintained without service interruption using the auger crane, a new utility pole can be erected in the same place and the arm or wire of the existing utility pole can be relocated to the new utility pole without service interruption.

In accordance with the present invention, there is provided a method of replacing a concrete utility pole for a distribution line without interrupting service using a pole clamp and pole crusher, the method comprising: a pole clamp coupling process for connecting a pole clamp to the end portion of the boom of an auger crane so as to operate hydraulically; a pole clamp mounting process for mounting the pole clamp onto the outer circumference of the concrete utility pole to be replaced; a pole crusher positioning process for positioning a pole crusher below the pole clamp using a hot-line bucket truck; a utility pole crushing process for crushing the concrete of the utility pole while rotating the pole crusher; a rebar cutting process for cutting the reinforcing bars of the utility pole after the pole crusher is removed from the utility pole; a utility pole removing process for removing the lower side of the old utility pole that is located below the cut portion of the utility pole while the upper side of the utility pole including arms and wires is held by the pole clamp; a new utility pole installing process for erecting and installing a new utility pole in the place where the old utility pole was removed; and a line relocation process for relocating the arms and wires from the deteriorated utility pole to the new utility pole without interrupting utility service.

Preferably, said pole clamp is provided with a binding chain whose tensile force is adjusted by hydraulic pressure supplied from the auger crane, so that said pole clamp is firmly mounted on the utility pole to be replaced by the hydraulic binding force of said binding chain, with the binding chain wound around and fixed on the outer circumference of the utility pole.

Preferably, said pole crusher is provided with an impacter operated by hydraulic pressure so as to crush the concrete of the utility pole to be replaced by the action of a crushing shaft reciprocating in and out toward the utility pole.

DETAILED DESCRIPTION OF THE PREFERRED EMBODIMENTS

Below will be described a preferred embodiment of the present invention with reference to the accompanying drawings.

The present invention relates to a method of replacing a utility pole that is to be replaced due to damage or deterioration without interrupting utility service, and this is a new method of installing a new utility pole in the same place where the utility pole to be removed was erected.

Figure 1:
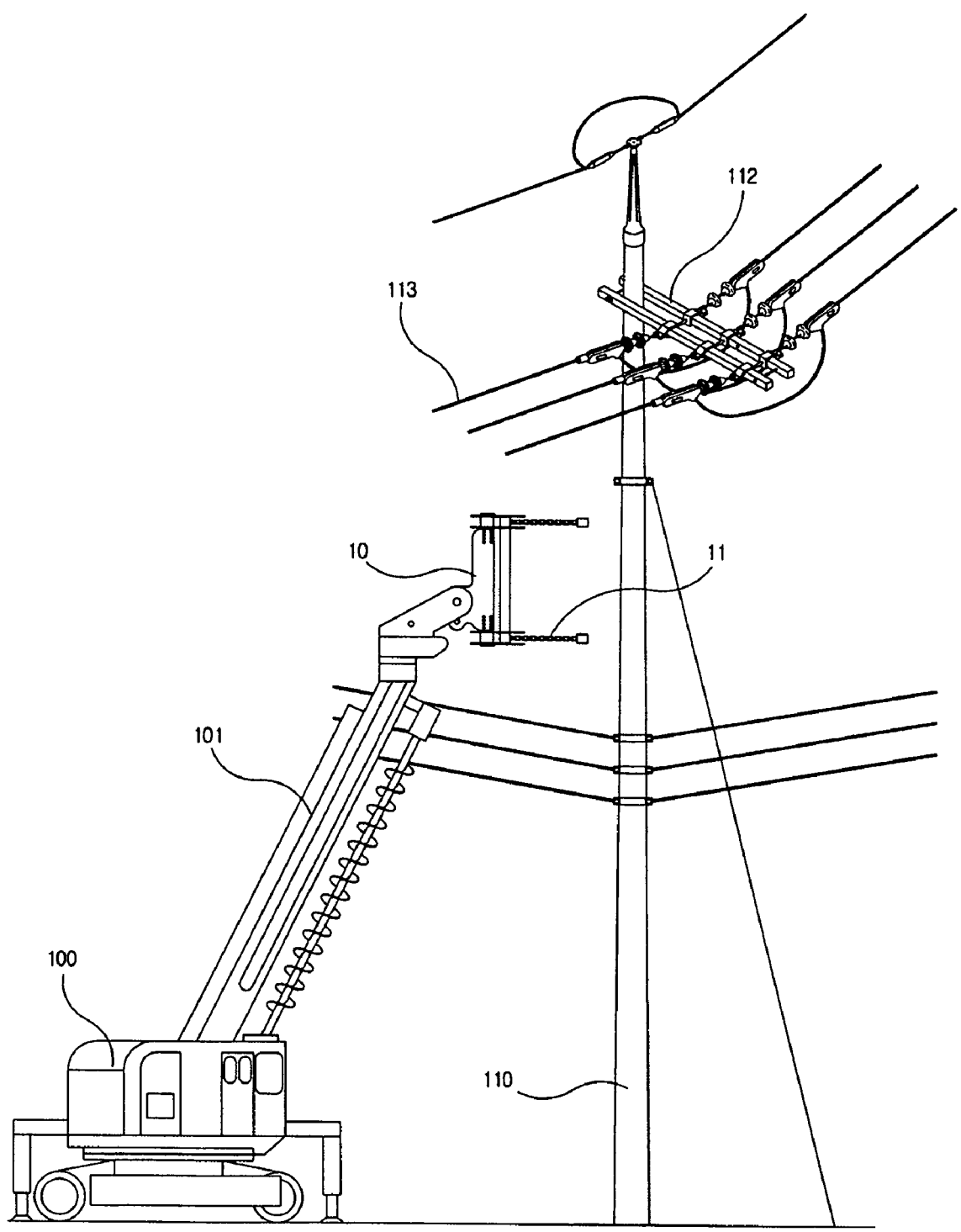
FIG. 1 is a schematic view showing an installation process of a pole clamp for replacing a concrete utility pole without interrupting service of the present invention.

In the method of replacing a utility pole of the present invention, a separate pole clamp 10 is mounted on the end portion of the boom 101 of an auger crane 100, as shown in FIG. 1, and the pole clamp 10 is operated by hydraulic pressure supplied from the auger crane 100. The binding chain 11 combined to the pole clamp 10 is operated by hydraulic pressure, and plays a role of firmly binding the deteriorated utility pole 110 which is to be replaced.

Namely, with the auger crane 100 positioned close to one side of the deteriorated utility pole 110, the length of the boom 101 is adjusted to position the pole clamp 10 mounted on the end portion of the boom 101 near a predetermined part of the deteriorated utility pole 110.

Figure 2:
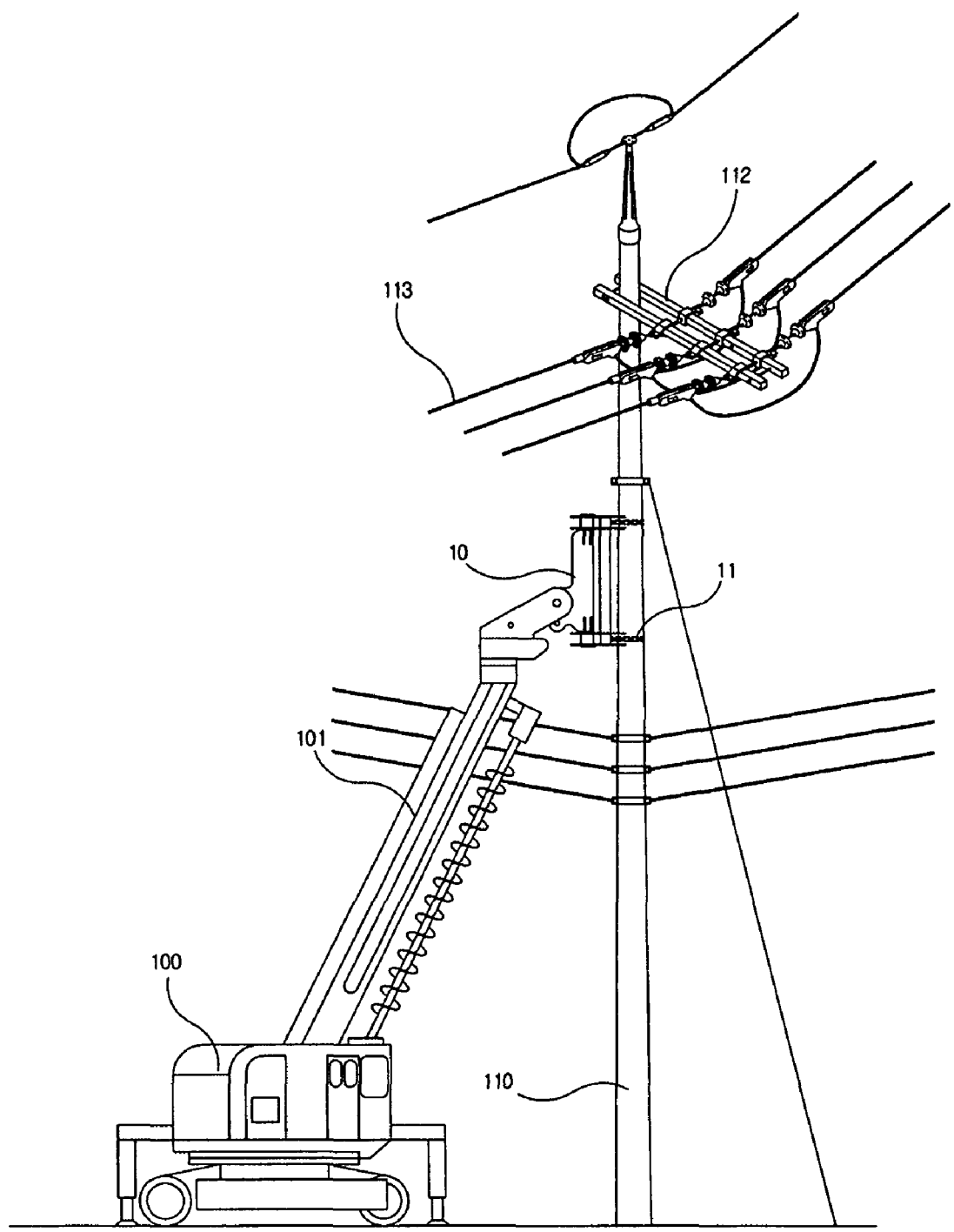
FIG. 2 is a schematic view showing the state in which the pole clamp is mounted on an old utility pole for replacing a new concrete utility pole without interrupting service of the present invention.

In this condition, the binding chain 11 of the pole clamp 10 is wound around and fixed to the deteriorated utility pole 110, and the binding chain 11 is pulled using hydraulic pressure supplied from the auger crane 100, so as to firmly fix the pole clamp 10 to the deteriorated utility pole 110, as shown in FIG. 2.

Figure 3:
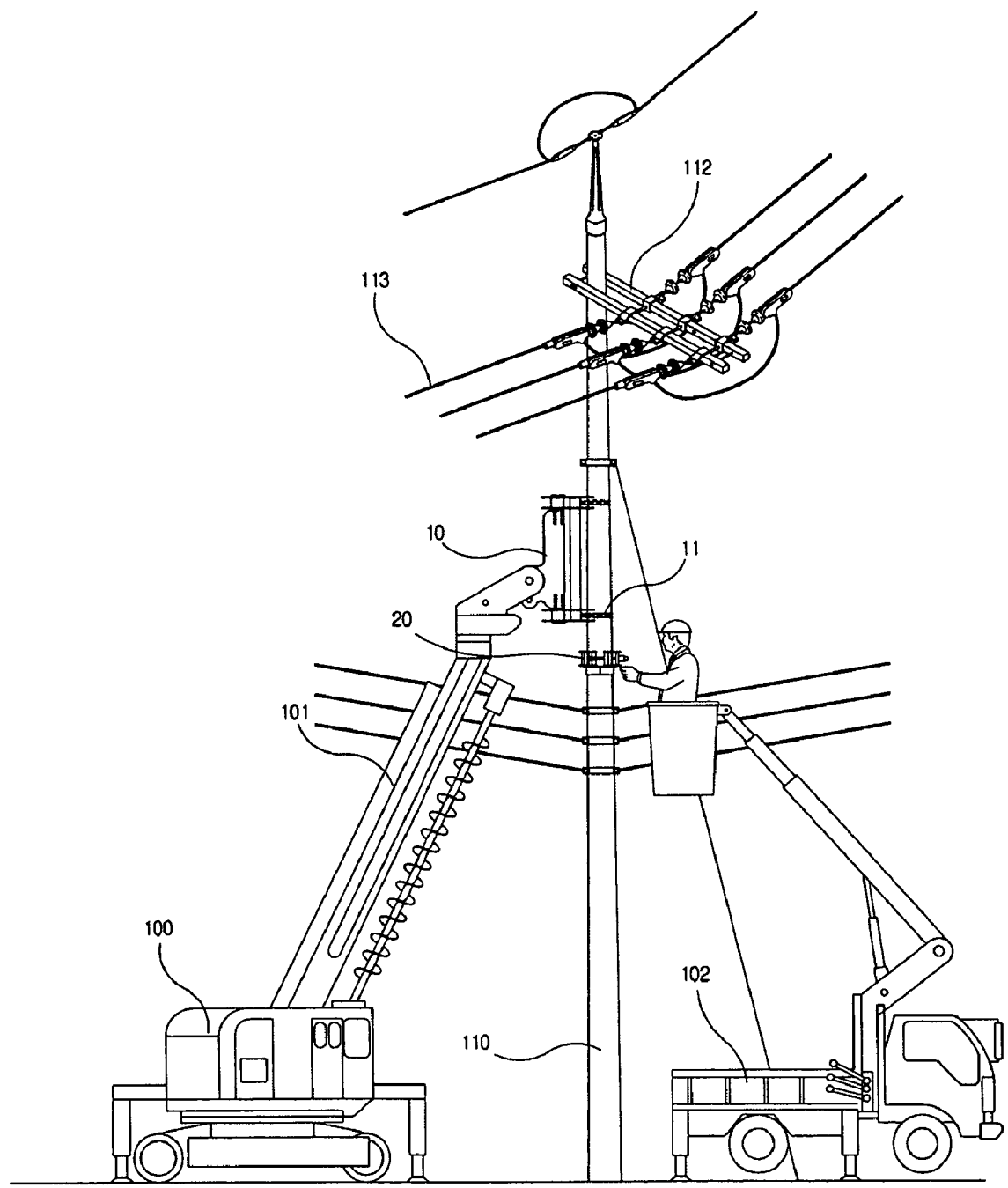
FIG. 3 is a schematic view showing the process of installing a pole crusher for replacing a concrete utility pole without interrupting service of the present invention.

And when it is confirmed that the deteriorated utility pole 110 is firmly fixed by the auger crane 100, a separate pole crusher 20 is mounted to the utility pole below the pole clamp 10 as shown in FIG. 3. The pole clamp 10 is mounted on a predetermined outer circumference of the deteriorated utility pole 110 to be cut, with the pole crusher 20 moved toward the utility pole using a separate hot-line bucket truck 102.

Figure 4:
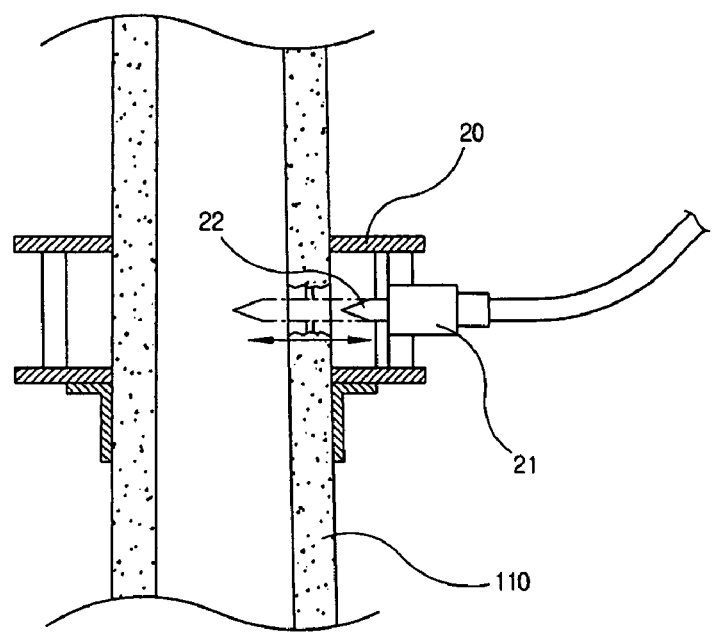
FIG. 4 is a sectional view showing the process of crushing the old utility pole using a pole crusher for replacing a new concrete utility pole without interrupting service of the present invention.

The pole crusher 20 has a dividing-binding structure and is provided with an impacter 21 operated by hydraulic pressure supplied from outside. Accordingly, the pole crusher 20 mounted on the deteriorated utility pole 110 to be cut supplies hydraulic pressure to the impacter 21 and when the crushing shaft 22 of the impacter 21 actuates instantaneously toward the deteriorated utility pole 110 to impact it, the concrete of the deteriorated utility pole 110 in contact with the crushing shaft 22 is crushed as shown in FIG. 4.

Accordingly, when the impacter 21 is operated while the pole crusher 20 is rotated around the outer circumference of the deteriorated utility pole 110, the concrete of the impacted portion of the deteriorated utility pole 110 is completely crushed by the crushing shaft 22.

Figure 5:
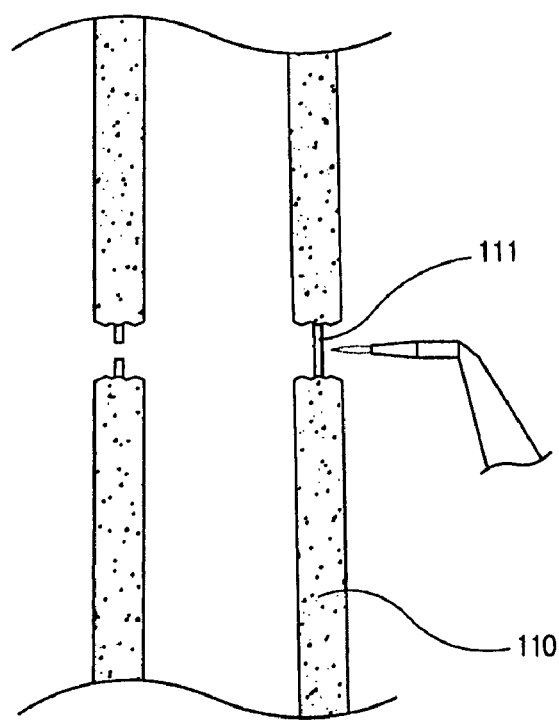
FIG. 5 is a sectional view showing the process of cutting reinforcing bars for replacing a concrete utility pole without interrupting service of the present invention.
Figure 6:
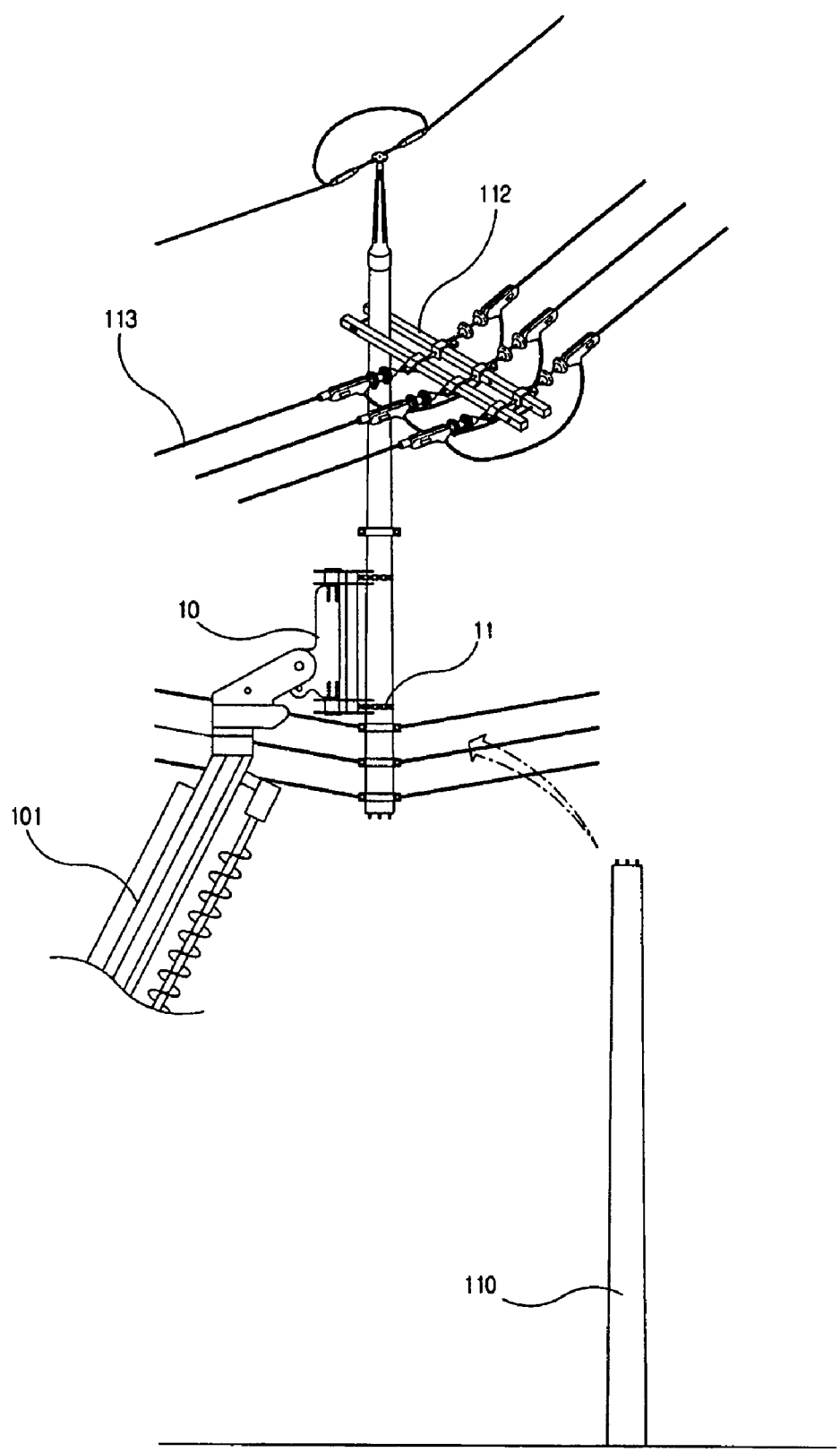
FIG. 6 is a schematic view showing the process of removing the old utility pole for replacing a new concrete utility pole without interrupting service of the present invention.

In particular, when the portion to be cut of the deteriorated utility pole 110 is crushed by the pole crusher 20, concrete is removed from the deteriorated utility pole 110 made of reinforced concrete, leaving only the remaining reinforcing bars 111 exposed. The remaining reinforcing bars 111 are cut using a welding torch or other cutting tool as shown in FIG. 5.

Accordingly, with the concrete and reinforcing bars of the deteriorated utility pole 110 cut completely using a pole crusher 20 and welding torch, the auger crane 100 is operated to lift up the upper portion of the utility pole, which is gripped by the pole clamp 10 mounted on the end portion of the boom 101, and then move it to a nearby location where there is no obstruction to installation of the new utility pole and stand by.

At this time, if low-tension lines or communication lines are installed on the lower portion of the utility pole that has been cut by the pole crusher 20 (that is, the utility pole portion that is still fixed in the ground), work is carried out to move these lines to the upper portion of the utility pole, so that no arms, wires or communication lines remain on the lower portion of the utility pole, which is to be removed.

After dismantling and removing the pole crusher 20 in this condition, the lower utility pole 110 is removed from the ground.

Figure 7:
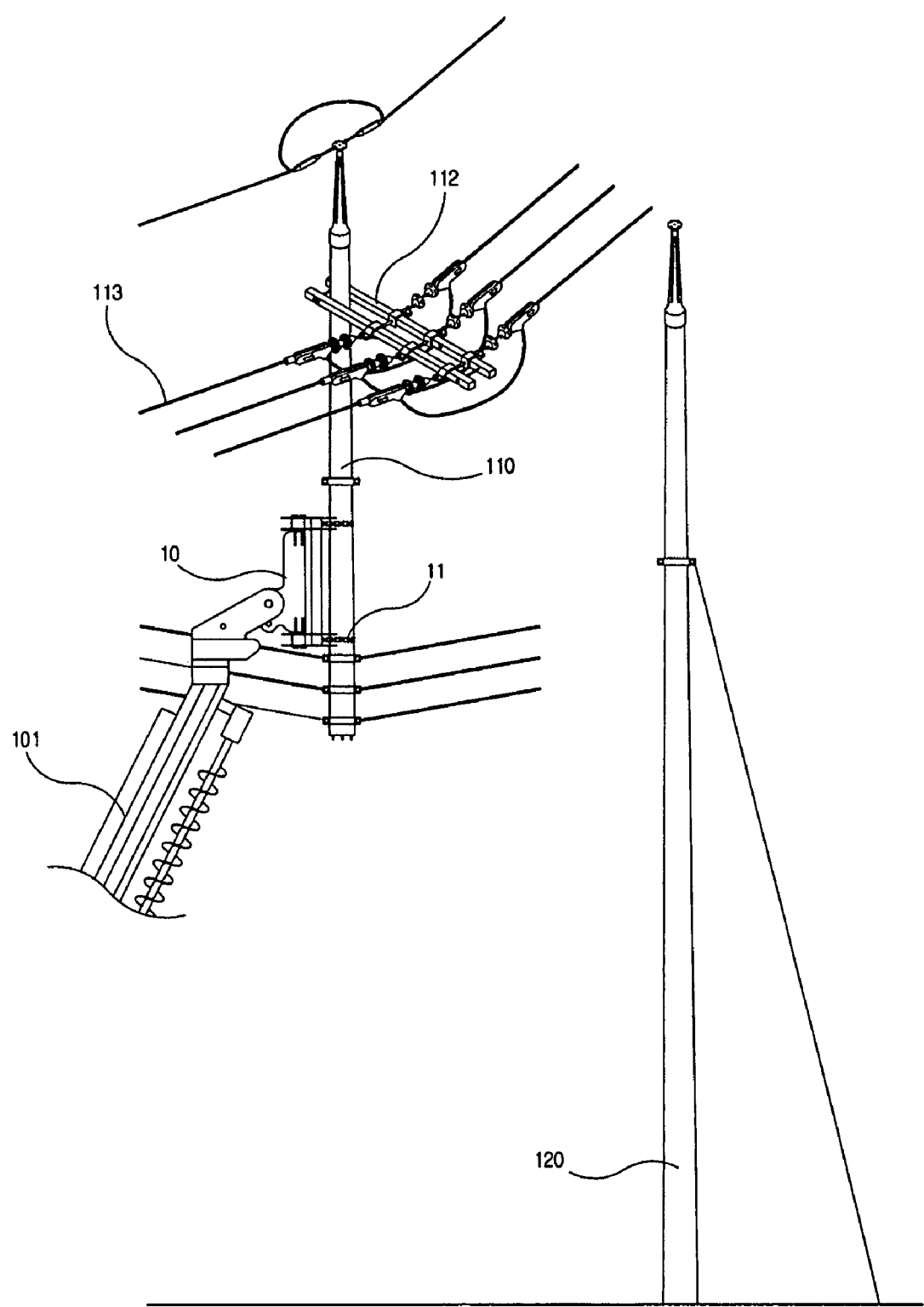
FIG. 7 is a schematic view showing the state in which a new utility pole is erected in place of the removed old utility pole according to the method of replacing a concrete utility pole without interrupting service of the present invention.
Figure 8:
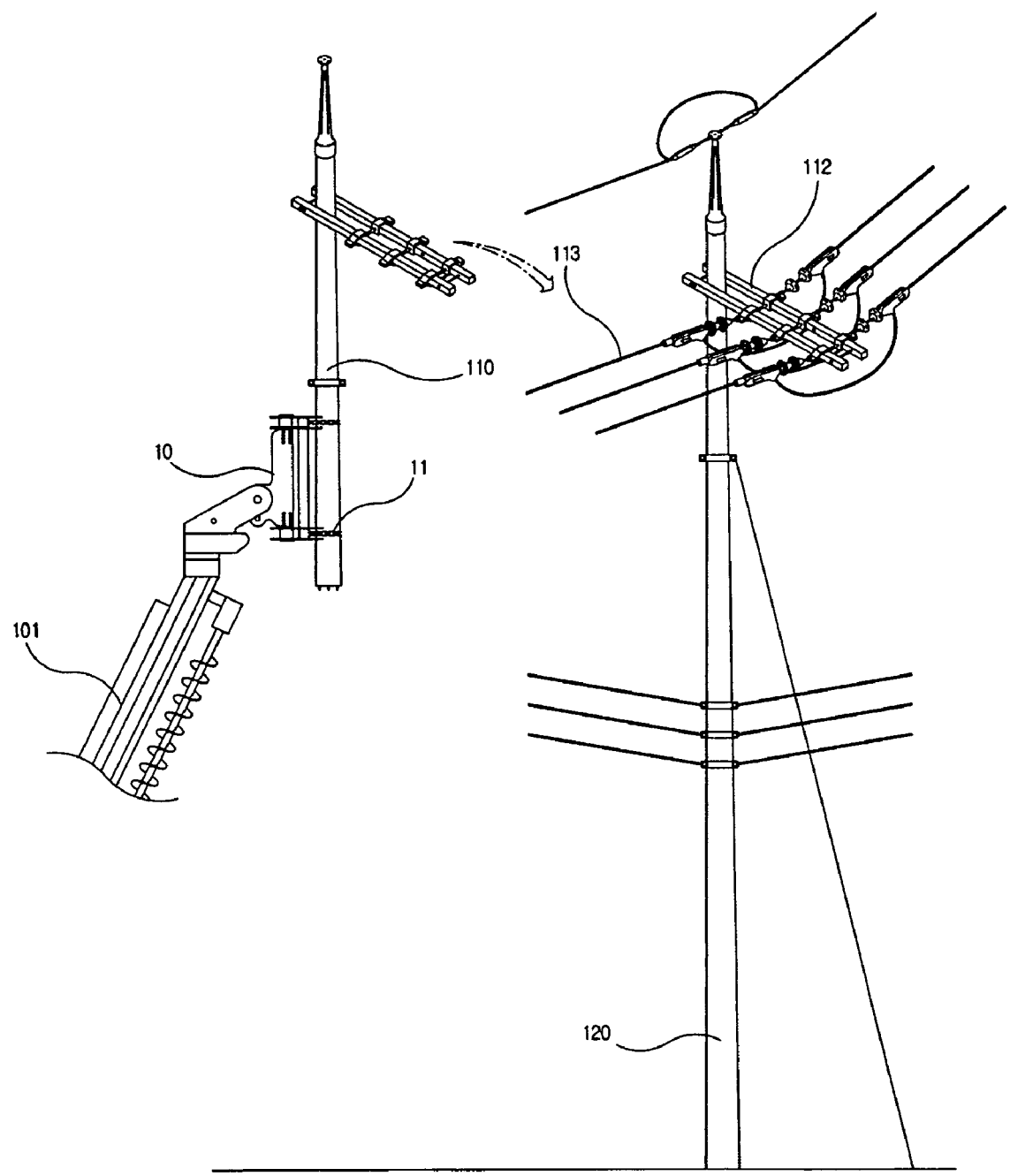
FIG. 8 is a schematic view showing the process of relocating the arm and wires of a utility pole to a new utility pole according to the method of replacing a concrete utility pole without interrupting service of the present invention.

After this, a new utility pole 120 is erected and installed in the place where the deteriorated utility pole 110 was removed as shown in FIG. 7, and the relocation process of moving the arms 112, wires 113, etc. installed on the upper side of the deteriorated utility pole 110 to the new utility pole 120 is performed as shown in FIG. 8.

In this way, after moving all of the arms 112, wires 113, transformer, low-tension lines and communication lines, the upper and lower sides of the deteriorated utility pole 110 are carried to a collection place for disposal.

Thus, it is possible to erect a new utility pole in the same place as the existing utility pole by the method of replacing a concrete utility pole without interrupting service according to the present invention regardless of problems such as buildings, structures or communication equipment nearby, or even when faced with circumstances where it is normally impossible to replace deteriorated utility poles without service interruption. Therefore, very efficient and stable distribution line work and relocation work are possible without interrupting service, in place of the conventional methods using an auxiliary support device or the temporary transmission method using a bypass cable.

According to the method for replacing a concrete utility pole for a distribution line using a pole clamp and a pole crusher of the present invention, a new utility pole can be installed in the same place where the existing utility pole was erected when replacing a deteriorated or damaged existing utility pole without interrupting service, so very effective work can be done even in a location constrained by place or space. And since relocation work goes on in such a way that the arm or wire is moved immediately from the existing utility pole to the new utility pole, work is done very safely, and the utility pole replacement work is done more quickly and conveniently by the use of a pole clamp mounted on the auger crane and the pole crusher using a hot-line bucket truck. Therefore, the replacement work is not only efficient and safe but also is helpful to improve the quality of electric power supply since the scope of work during which it is possible to maintain uninterrupted power distribution is expanded.

Although the present invention has been described in detail with reference to its presently preferred embodiment, it will be understood by those skilled in the art that various modifications and equivalents can be made without departing from the spirit and scope of the present invention, as set forth in the appended claims.

What is claimed is:

1. A method for replacing a concrete utility pole and distribution lines without interrupting power supply service adopting a pole clamp and pole crusher, said method comprising steps of:
   connecting a hydraulic pole clamp to an end portion of a boom of an auger crane,
   mounting the pole clamp onto the outer circumference of an old concrete utility pole,
   mounting the pole crusher to the old concrete utility pole below the pole clamp using a hot-line bucket truck,
   crushing the old concrete of the utility pole while rotating the pole crusher,
   cutting the reinforcing bars of the old utility pole after the pole crusher is removed from the utility pole,
   removing the lower portion of the old utility pole to be replaced that is located below the cut while the upper side of the utility pole having arms and wires is held by the pole clamp,
   erecting and installing a new utility pole in the place where the old utility pole has been removed, and
   relocating the arms and wires from the old utility pole to the new utility pole.

2. The method for replacing a concrete utility pole as set forth in claim 1, wherein said pole clamp is provided with a binding chain whose tensile force is adjusted by hydraulic pressure supplied from the auger crane, so that said pole clamp is firmly mounted on the utility pole to be replaced by the hydraulic binding force of said binding chain, with the binding chain wound around and fixed onto the outer circumference of the utility pole.

3. The method for replacing a concrete utility pole as set forth in claim 1, wherein said pole crusher is provided with an impacter operated by hydraulic pressure so as to crush the concrete of the old utility pole via the action of a crushing shaft reciprocating in and out toward the utility pole by operation of the impacter.

* * * * *